United States Patent
Coles

(10) Patent No.: US 6,827,274 B2
(45) Date of Patent: Dec. 7, 2004

(54) METHOD OF FORMING AN IMAGE, AND TO A PRODUCT HAVING AN IMAGE FORMED THEREON

(75) Inventor: Raymond W. Coles, Weymouth (GB)

(73) Assignee: Ultra Electronics Limited, Middlesex (GB)

( * ) Notice: Subject to any disclaimer, the term of this patent is extended or adjusted under 35 U.S.C. 154(b) by 0 days.

(21) Appl. No.: 10/038,403

(22) Filed: Jan. 2, 2002

(65) Prior Publication Data

US 2003/0207087 A1 Nov. 6, 2003

Related U.S. Application Data

(63) Continuation-in-part of application No. 09/678,062, filed on Oct. 2, 2000.

(51) Int. Cl.$^7$ .............................................. G06K 19/00
(52) U.S. Cl. ....................... 235/487; 235/488; 235/432
(58) Field of Search ............................ 283/67; 235/491, 235/494, 487, 488, 432; 902/25; 347/212; 156/234; 400/61; 503/217

(56) References Cited

U.S. PATENT DOCUMENTS

| 4,501,439 A | 2/1985 | Antes |
|---|---|---|
| 4,680,458 A | 7/1987 | Drexler |
| 4,897,533 A | 1/1990 | Lyszczarz |
| 5,260,254 A | 11/1993 | Hotta et al. |
| 5,278,129 A | 1/1994 | Watanabe et al. |
| 5,521,371 A | 5/1996 | Hotta et al. |
| 5,688,056 A | 11/1997 | Peyret |
| 5,990,918 A | 11/1999 | Baxendale |
| 6,164,548 A * | 12/2000 | Curiel ......................... 235/487 |
| 6,387,201 B1 | 5/2002 | Stuart et al. |
| 6,471,128 B1 * | 10/2002 | Corcoran et al. ............ 235/488 |
| 6,644,551 B2 * | 11/2003 | Clayman et al. ............. 235/488 |
| 6,655,598 B1 * | 12/2003 | Curiel ......................... 235/487 |
| 6,715,797 B2 * | 4/2004 | Curiel ......................... 283/67 |
| 2004/0011874 A1 * | 1/2004 | Theodossiou et al. ....... 235/488 |

FOREIGN PATENT DOCUMENTS

| DE | 29622700 U1 | 7/1997 |
|---|---|---|
| EP | 0407615 A1 | 1/1991 |
| WO | WO 96/30215 | 10/1996 |

* cited by examiner

Primary Examiner—Jared J. Fureman
(74) Attorney, Agent, or Firm—Baker & McKenzie LLP

(57) ABSTRACT

A security card is provided in which an ink region 6 bearing image or textural data is printed onto a substrate 4. A reflective portion 8 is also provided on the substrate 4. A plastics protective layer 7 is deposited over the ink 6 and reflective element 8. Portions 10 of the protective layer 7 are overworked in order to change their appearance. Those portions overlying the reflective element 8 exhibit enhanced visibility.

21 Claims, 3 Drawing Sheets

METHOD OF FORMING AN IMAGE, AND TO A PRODUCT HAVING AN IMAGE FORMED THEREON

PRIORITY CLAIM AND RELATED APPLICATION

This application is a continuation-in-part application and claims priority to U.S. patent application Ser. No. 09/678,062 filed Oct. 2, 2000 entitled "Method of Forming an Image, and to a Product Having an Image Formed Thereon" and is incorporated herein by reference.

BACKGROUND OF THE INVENTION

The present invention relates to a method of forming an image, and to a product having an image formed thereon. In particular, this invention provides an enhanced security image.

WO96/30215 describes a method of forming an image on a surface of a card, and in particular the formation of a security card. In general terms, a plastics card is provided on to which an image and other data or markers is printed for example using a dye sublimation or dye diffusion printing process. Once printed, the image on the card is protected by laying down a thin transparent plastic coating. The plastic coating (hereinafter called "overcoat") is deposited by thermal transfer printing. Security images can also be formed in the overcoat by overheating portions of it, thereby changing the optical properties over the overcoat. In general, the overheated portions of the film take on a less glossy (i.e. matt or satin), appearance. Thus additional images confirming the authenticity of the card can be formed in the transparent layer, with the printed portion of the card being visible therethrough. The security images can be easily seen when the card is illuminated by a unidirectional light source, but are less clear when viewed in diffuse light.

BRIEF SUMMARY OF THE INVENTION

According to a first aspect of the present invention, there is provided a method of forming an image, comprising providing a substrate having at least one reflective region thereon, and selectively depositing a plastics material over the reflective region so as to form an image.

It is thus possible to provide an improved security card. The applicant has discovered that the security markings become much more visible, even in diffuse light, when printed over a reflective region.

Preferably the plastics material is overheated so as to change its optical properties. Preferably the plastic is transparent.

Advantageously the reflective region comprises a reflective film, such as a metallic film, or a film exhibiting mirror like reflection properties. The metal film may be printed on to the substrate. Thus a metal film may be provided on blank card stock at the time of manufacture of security cards. Alternatively, the reflective film may be printed onto the card as part of the card printing process. Thus, for example, the metal film may be provided on a carrier film and be brought into contact with the substrate at a printing station in order to transfer the metal film to the substrate.

Preferably the layer of plastics film is provided on a carrier film. The carrier film may be brought into contact with the substrate at a printer having a plurality of heater elements. The heater elements may be energized in order to thermally transfer the plastics material from the carrier film to the substrate.

The heater elements may be energized at a plurality of energy levels in order to vary the thickness of the plastics film transferred. The varying thickness thereby resulting in a variable appearance of the film.

Alternatively, the heater elements may be energized to a first value in order to transfer the entirety of the thickness of the plastics film to the substrate, and selective ones of the heater elements may be energized to a second value in order to overwork or overheat the deposited film, thereby varying its optical properties. Thus the appearance of the overworked areas may be matt or satin, when compared to the other portions of the film.

The plastics layer is preferably deposited as a continuous film over those portions of the substrate not covered by a reflective region.

The security image may be repeatedly printed across the card in a repeat and step like manner. However, advantageously at least one of the images overlies the reflective region.

Advantageously the print instructions for the security image are stored in a memory device. The memory device may, for example, be implemented in the form of a removable memory card, a dongle, a smart card or other equivalent removable memory element. The security image may be held in an encrypted form and local processing may also be provided such that the encrypted image cannot be accessed without a suitable key. The key may, for example, be available to authorize users on a time limited fashion such that once the key expires the security image can no longer be printed. Replacement keys may be obtained via a telecommunications network, for example over the Internet, or by distribution of suitably encoded disks or by passwords. Alternatively the printer itself may act as the key to read the data from the memory element.

The printer may have a data processor arranged such that the printer negotiates with the memory element to obtain the security image therefrom. The security image may be in an encrypted form. The encrypted form may differ every time the image is read from the memory device. The data processor in the printer is arranged to decrypt the image.

According to a second aspect of the present invention, there is provided a security product printed in accordance with the first aspect.

Advantageously the security product is one of a bank card, a credit card, and a security card.

It is thus possible to provide a security card comprising a plastics substrate bearing on at least one portion thereof a reflective element, and a plastics layer deposited over the substrate and the reflective element, the optical properties of the plastics layer being altered in at least the region overlying the reflective element in order to form a visible marking therein.

Advantageously the substrate is printed with identification details, such as words, pictures or other indicia. The printing may be performed by dye sublimation printing. Following the printing step, the protective layer is then deposited on the card, with the simultaneous formation of security images in the protective layer. The protective layer may be applied to the card by thermal transfer.

BRIEF DESCRIPTION OF THE DRAWINGS

The present invention will further be described, by way of example, with reference to the accompanying drawings, in which.

DETAILED DESCRIPTION OF THE INVENTION

Figure 1:
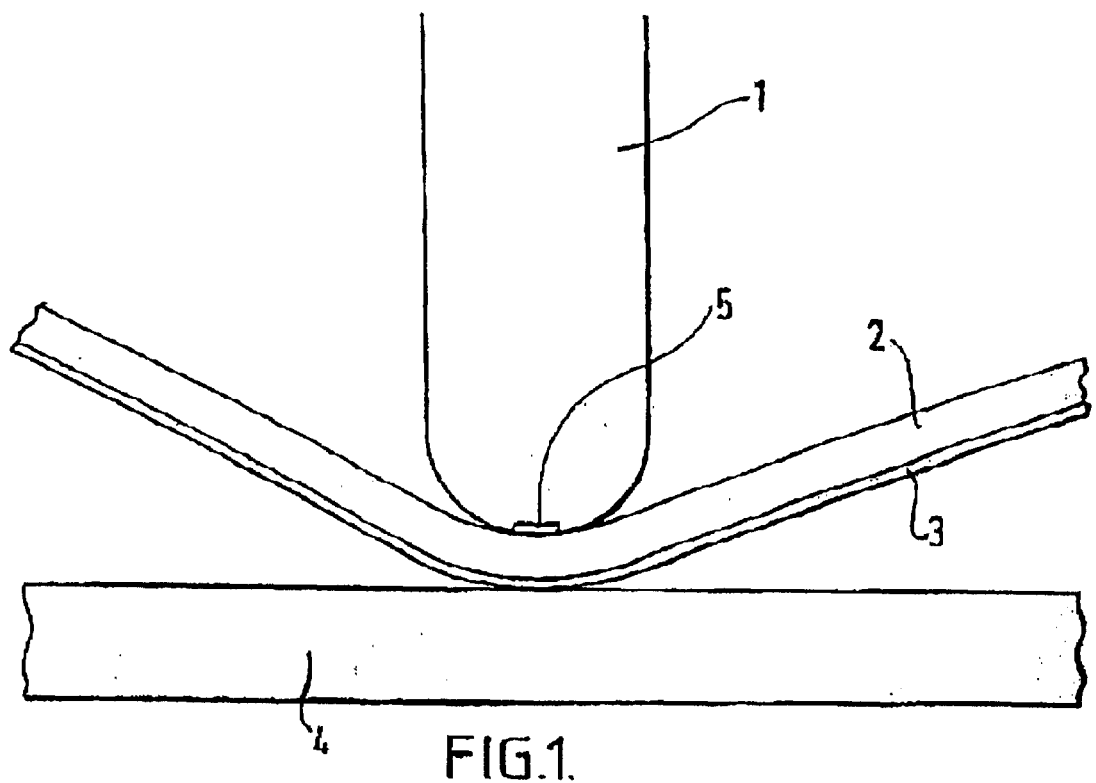
FIG. 1 is a cross-section of a thermal array print head as used according to the present invention.
Figure 2:
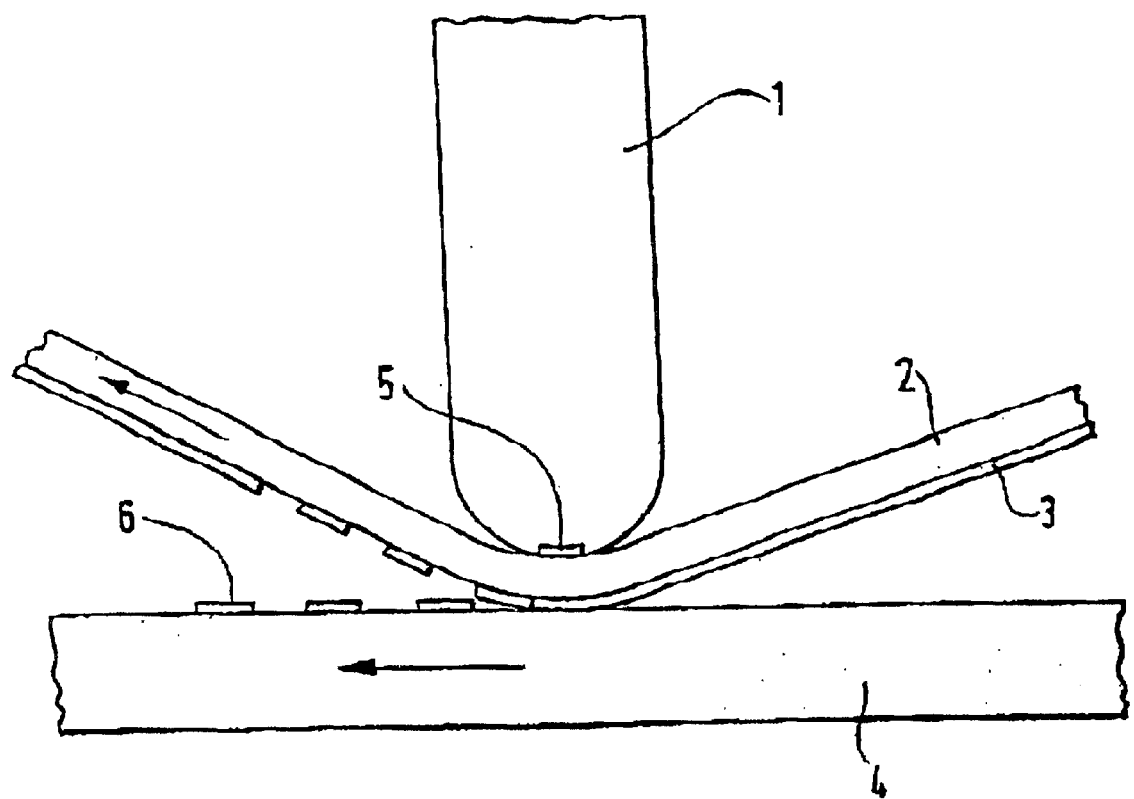
FIG. 2 illustrates how the print head of FIG. 1 prints an image by depositing pigment on a receiver surface.

As shown in FIGS. 1 and 2, a thermal print head 1 is in intimate contact with a carrier film 2 on which a pigment 3 on the surface thereof is pressed against a receiver layer 4. The receiver layer acts as a substrate. The carrier film 2 and the receiver layer 4 are moved together relative to the print head 1. In use, heater elements 5 aligned along the print head are selectively energized by electrical pulses to transfer dots or pixels 6 of pigment to the receiver layer 4 in successive lateral rows across the width of the receiver layer.

Figure 3:
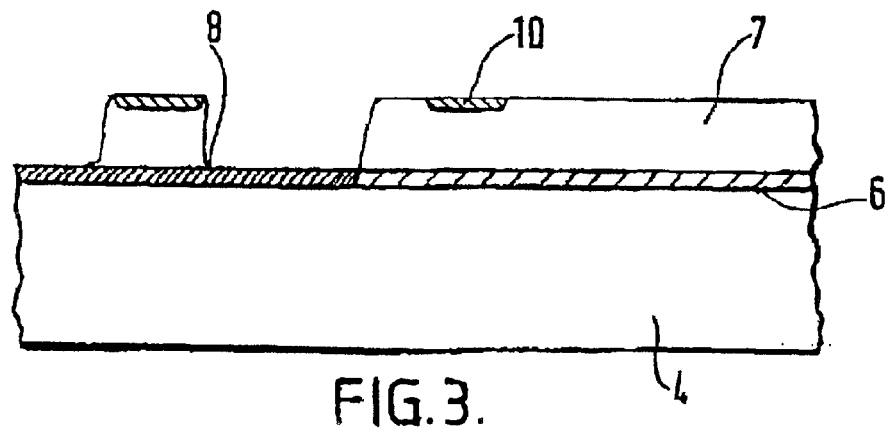
FIG. 3 is a cross section of a printed receiver surface of FIG. 2 with a protective plastics film coating applied to it and incorporating a texture image therein.

The receiver layer is provided, at least in part, with one or more reflective areas formed by bonding or otherwise depositing a shiny, and preferably metallic, film to the surface of the receiver layer 4. The reflective region is designated 8 in FIGS. 3 and 4. The reflective layer 8 may be deposited in a printing step prior to the printing of the pixels of ink, or may be provided as part of the receiver layer, for example during its manufacture.

During a subsequent plastics coating process, which could involve the same print head 1 or a similar print head, a coating of clear plastics material 7 is transferred onto the receiver layer 4, thereby overlaying the pigment layer 6 and the reflective layer 8. However, where it is desired to form an image over the reflective layer, the plastic material is only deposited where it is desired to make a mark, the remainder of the reflective layer is left uncovered.

The clear plastics material may be carried on a carrier film which passes beneath the print head with the receiver layer 4 in a similar manner to that described with reference to FIG. 2. Again the heater elements of the print head are selectively energized to transfer pixels or dots of the plastics material 7 to the receiver layer 4 so that the whole of the pigment layer 6 and the selected portions of the reflective element 8 are coated.

The heater elements 5 may be selectively energized so as to transfer varying thicknesses of the plastics layer to the receiver layer 4. However, in a preferred embodiment, the heater elements are energized so as to transfer the whole thickness of the carrier film to the receiver layer 4, and the relevant portions of the reflective layer with selected areas 10 being heated to a greater amount. The additional heating overworks the clear plastics layer and modifies its shiny upper surface thereby creating regions 10 which are not shiny and which have a matt or satin like appearance. Thus a uniformly thick protective layer bearing an image can be deposited onto to receiver layer and images printed thereon.

The applicant has found that, unexpectedly, those images printed over the reflective element 8 are clearly visible even in diffuse light and this enhances the usefulness and visibility of the security image.

Figure 4:
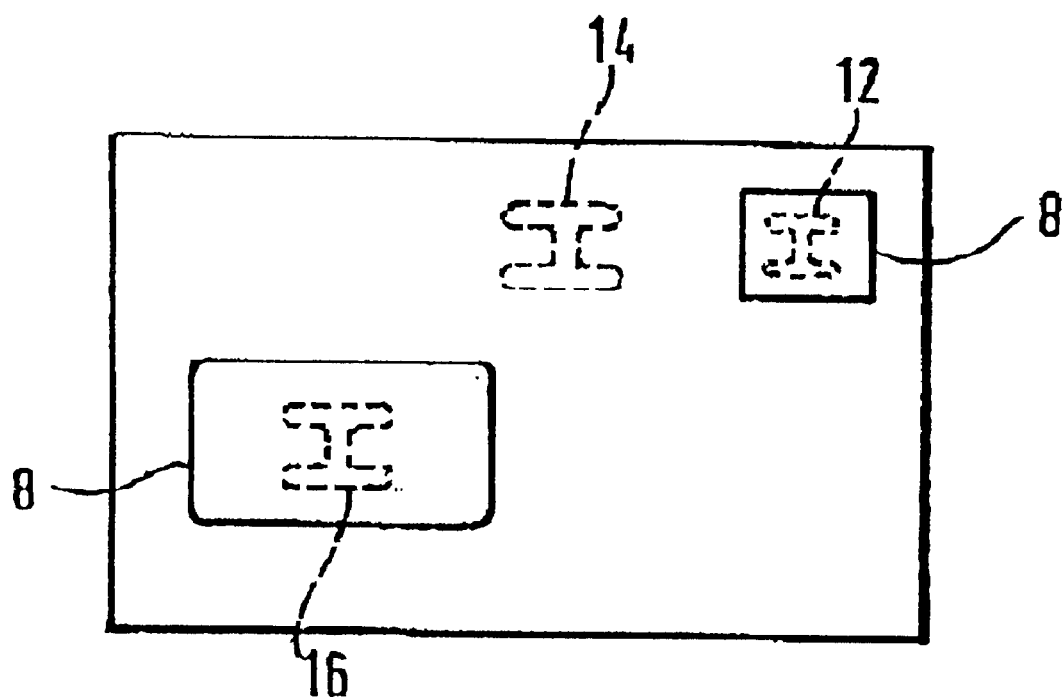
FIG. 4 is a plan view of a security card constituting an embodiment of the present invention.

FIG. 4 schematically illustrates a security card constituting an embodiment of the present invention. In plan view, various images 12, 14 and 16 are formed in the plastics layer 7. The image 12 overlying the reflective element 8 is clearly visible, whereas the images 14 and 16 not overlying the reflective layer 8 are more faint. The image 16 overlies a printed area 18 with a text or other image formed in the area 18 being visible through the security image 16.

Figure 5:
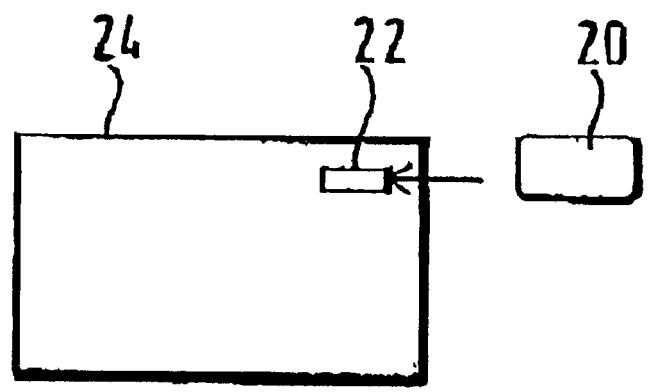
FIG. 5 schematically illustrates a printer for printing a card according to the present invention.

FIG. 5 illustrates a printer for printing identity or other secure cards.

The instructions for encoding the security image may be encoded within a removable encryption processor and memory element 20, which may, for example, be a compact flash package removable from or introducible into a suitable reader 22 in a card or other printer 24.

It is thus possible to provide an improved security printing method and an improved security card. In testing, blank cards with the reflective patch 8 preformed thereon were obtained from Bristol Business Cards of Bristol, England.

What is claimed is:

1. A method of forming a security card, comprising the steps of:
   a) providing a substrate having a reflective region covering a portion of the substrate that is substantially less than the an entire surface of the substrate, wherein the reflective region comprises a metal film suitable for increasing the visibility of an overlying security image;
   b) thermally depositing identification details onto the substrate; and
   c) depositing a protective layer of plastics material onto the substrate so as to protect the identification details, and selectively depositing the protective layer over the reflective region so as to form the security image thereon.

2. A method as claimed in claim 1, wherein the metal film is printed onto the substrate.

3. A method as claimed in claim 2, in which the metal film is provided on a carrier film and is brought into contact with the substrate at a printing station and transferred to the substrate.

4. A method as claimed in claim 1, wherein the protective layer of plastics material is provided on a carrier film and in which a plurality of heater elements are provided on a thermal print head, and in which the heater elements are energized when the carrier film is in contact with the substrate to transfer the plastics material to the substrate.

5. A method as claimed in claim 4, in which the heating elements are energized to deposit a continuous layer of the plastics material over the whole of an area to be covered that is not covered by the reflective region such that the plastics material serves as a protective coating.

6. A method as claimed in claim 5, in which selected regions of the plastics material are heated to a greater degree than other areas so as to vary a surface appearance of the protective layer.

7. A method as claimed in claim 6, in which the full thickness of the plastics material is deposited and selected portions thereof are overheated so as to give these portions a different appearance.

8. A method as claimed in claim 7, in which the overheated portions have a satin appearance.

9. A method as claimed in claim 7, in which the overheated portions have a matt appearance.

10. A method as claimed in claim 1, in which the image is printed over the substrate in a repeating pattern.

11. A method as claimed in claim 1, in which the plastics material deposited over the reflective region is heated to a greater degree than is necessary to deposit the plastics material so as to vary the surface appearance thereof.

12. A method as claimed in claim 11, in which the regions of plastics material which are heated to a greater degree than necessary to deposit the plastics material have one of a satin and matt appearance.

13. A method as claimed in claim 1, in which the protective layer of plastics material is deposited on the substrate during a printing process, and in which the security image is held in a memory device readable by one of the printer and a data processor controlling the printer.

14. A method as claimed in claim 13, in which the memory device is a removable device.

15. A method as claimed in claim 13, in which the image is held in an encrypted form.

16. A surface printed in accordance with the method of claim 1.

17. A printed item, said item comprising a substrate having a first surface, wherein a reflective element is provided on a portion of the first surface that is substantially less than the entire first surface of the substrate, wherein the reflective element comprises a metal film suitable for increasing the visibility of an overlying security image, and where identification details are printed onto the first surface and wherein a plastics layer is deposited over the substrate and is selectively deposited over the reflective element.

18. A printed item as claimed in claim 17, in which the plastics layer is deposited as a substantially uniform layer, over those portions of the substrate not carrying the reflective element.

19. A printed item as claimed in claim 18, in which portions of the plastics layer are overheated in order to change the appearance of those portions.

20. A printed item as claimed in claim 17, in which the item is an identity card.

21. A printed item as claimed in claim 17, in which the item is one of a security card, bank card, license and credit card.

* * * * *